United States Patent [19]

Hirt et al.

[11] 4,260,204
[45] Apr. 7, 1981

[54] DAMPING RESTRAINING BEARING FOR SUPERCRITICALLY OPERATION ROTORS

[75] Inventors: Dieter Hirt, Augsburg; Richard Steigenberger, Friedberg, both of Fed. Rep. of Germany

[73] Assignee: Maschinenfabrik Augsburg-Nurnberg, Munich, Fed. Rep. of Germany

[21] Appl. No.: 36,021

[22] Filed: May 4, 1979

[30] Foreign Application Priority Data

May 13, 1978 [DE] Fed. Rep. of Germany ....... 2821177

[51] Int. Cl.$^3$ .................... F16C 21/00; F16C 23/00; F16C 17/10
[52] U.S. Cl. .......................................... 308/9; 308/35; 308/141
[58] Field of Search ................. 308/9, 26, 35, 72, 140, 308/141, 145, 160, DIG. 15, 158, 159

[56] References Cited

U.S. PATENT DOCUMENTS

| | | | |
|---|---|---|---|
| 3,371,970 | 3/1968 | Beerli | 308/140 |
| 3,781,071 | 12/1973 | Kauzlarich | 308/9 |
| 4,116,501 | 9/1978 | Mötz et al. | 308/9 |

FOREIGN PATENT DOCUMENTS

| | | | |
|---|---|---|---|
| 2206237 | 8/1973 | Fed. Rep. of Germany | 308/DIG. 15 |
| 2725002 | 12/1977 | Fed. Rep. of Germany | 308/9 |
| 2902492 | 7/1979 | Fed. Rep. of Germany | 308/9 |
| 52-14157 | 2/1977 | Japan | 308/26 |
| 1398189 | 6/1975 | United Kingdom | |

Primary Examiner—Richard R. Stearns
Attorney, Agent, or Firm—Scully, Scott, Murphy & Presser

[57] ABSTRACT

Damping restraining bearing for supercritically operating rotors encompassing the rotor with a predetermined gap. The restraining bearing is actuated or deactivated responsive to radial rotor movements. The restraining bearing includes a damping member which is coupled to a damping bearing arranged at one end of the rotor for centering of the rotor.

6 Claims, 1 Drawing Figure

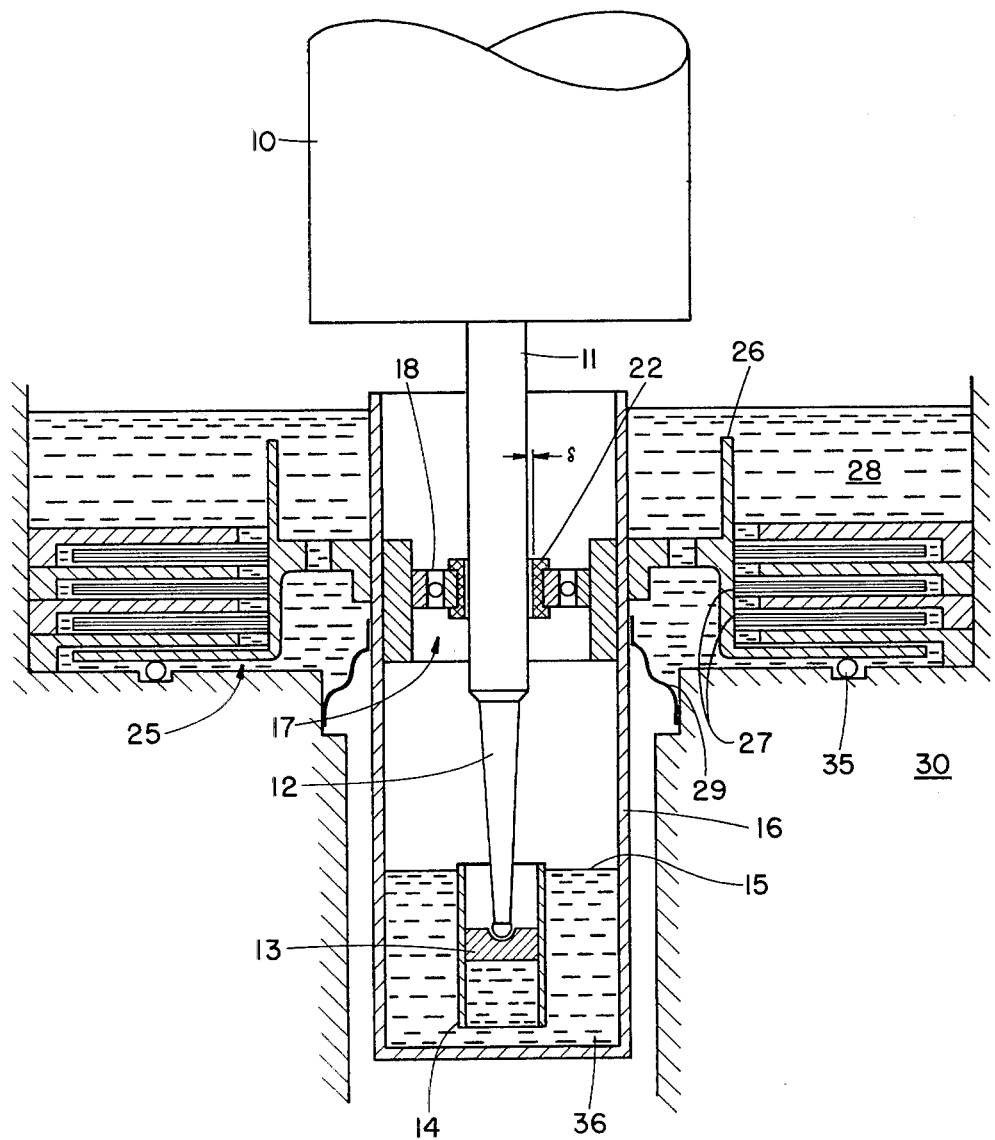

DAMPING RESTRAINING BEARING FOR SUPERCRITICALLY OPERATION ROTORS

BACKGROUND OF THE INVENTION

1. Field of the Invention

The present invention relates to a damped restraining bearing for supercritically operating rotors, which encompasses the rotor with a definite gap and in response to radial rotor movement is activated or deactivated and whereby, for centering and restraining bearing relative to the rotor, the damping member of the restraining bearing is integrated with a damping bearing of the rotor.

The requirements which are set for a restraining bearing are that the bearing should respond rapidly when traversing critical speed range, that it should effectively dampen vibrations, that it should quickly disengage, and that it should not come into contact with the rotor during normal rotor operation.

2. Discussion of the Prior Art

In order to meet these requirements, it has been proposed that the restraining bearing be provided with a centering device which will center the restraining bearing relative to the rotor. Centering arrangements of this type render it possible to minimize the gap needed for unrestrictive operation between the rotor and the encompassing restraining bearing without causing the rotor to contact the restraining bearing during periods of smooth operation or during rated operation. This arrangement results in a bearing which is smooth running, and has a short response period as well as a rapid disengagement. The rapid disengagement is achieved because the centering action causes the restraining bearing to follow the rotor radially to some measure and to disengage much earlier during attentuation of vibrations than other known restraining bearings.

As a result of the forced guidance between the restraining bearing and the rotor, the arrangement will, apart from the advantage of rapid engagement and disengagement, also prevent a springing movement between rotor and restraining bearing during rated operation. This all contributes to safe and stable rotor operation with a minimal loss of input energy.

SUMMARY OF THE INVENTION

The centering arrangement may be formed either by a magnetic coupling of the rotor and the restraining bearing, for which there may be used permanent magnets or electromagnets which are attached oppositely each other fastened, respectively, to the restraining bearing and the rotor, so that an air gap is allowed to remain between them in the direction of the rotor axis. The magnets are individual circularly regularly spaced magnets, or optionally may also be ring magnets.

The centering arrangement can alternatively also be formed by coupling the restraining bearing, or its damping member, to a bearing for supporting and damping the rotor.

In a further embodiment of the invention, the damping bearing which is coupled to the restraining bearing is an end bearing of the rotor.

In this arrangement, the restraining bearing is located on the side of the damping bearing facing towards the center of the rotor and thereby is positioned beyond a nodal point of rotor deflections as well as externally of the antinodal region. This will assure that the restraining bearing is located in a region of the rotor deflections but not in the highest loads as would be encountered at the antinodes.

Because the clearance between the restraining bearing and the rotor can be minimized by means of the centering, the restraining bearing can even be brought relatively close to a nodal point without substantially impairing its ability to respond to bending vibrations. Thereby, it is further possible to design the restraining bearing for relatively low restoring forces.

A further advantage is obtained for rotors with larger diameters, in which the restraining bearing would not be able to cope with the high peripheral speeds. In this instance, coupling the restraining bearing to an end bearing provides the capability of using a shaft with a correspondingly reduced diameter for the restraining bearing.

An advantage is also obtained by constructing the end bearing as a pivot bearing movably arranged in a damping liquid, where the housing of the damped pivot bearing is connected with the damping member of the restraining bearing.

In this arrangement, the housing of the damped bearing concurrently serves to retain the restraining bearing while carrying the pivot bearing and the damping member of the restraining bearing, wherein the latter concurrently serves as the damping support for the housing.

Pursuant to a further embodiment of the present invention, the housing is a cylindrical vessel which is open at one end, where a damping member coupled to the pivot bearing through the diaphragms proximate the bottom is arranged at the open end of the restraining bearing.

BRIEF DESCRIPTION OF THE DRAWING

The single FIGURE of the accompanying drawing schematically illustrates an embodiment of a restraining bearing for supercritically operating rotors.

DETAILED DESCRIPTION

A rotor 10 including a shaft 11 and a bearing pivot pin 12 is supported in a pivot bearing 13. The pivot bearing 13 is arranged in a damping sleeve 14 and suspended within a damping fluid 36 in a housing 16 by means of diaphragm 15. Arranged in the upper end of the housing 16 is a restraining bearing 17 having a facing collar 22 which is rotatably supported by a ball bearing 18.

Surrounding the housing 16 is a damping member 25 for the restraining bearing 17 which is connected with member 25. The damping member consists of a hollow cylinder 26 having fastened thereto a plurality of damping disks 27 which, together with the cylinder 26, are immersed in a damping liquid 28. A diaphragm or membrane 29 serves to seal the damping liquid-filled space between the movable damping housing 16 and the stationary housing 30.

The coupled-together pivot bearing and restraining bearing system 13, 17 finally is movably supported on balls 35, and is centered relative to the stationary housing by means of the diaphragm 29. The damping housing 16 supports the pivot bearing 13 by means of diaphragm 15 which evidences a lower stiffness than the diaphragm 29, also serves for centering the rotor shaft relative to the facing collar 22 during the appearance of minor disturbances. The gap between the facing collar 22 and the shaft 11 thus remains uniform around the circumference during normal rotor operation. The damping member 25 and the housing 16, hereby remain unmoved as rigid structures.

As soon as the shaft 11 contacts the facing collar 22 of the restraining bearing 17 due to more intense disturbances, the damping member 25 comes into operation. Radial movements of the restraining bearing collar 22 will then be transmitted to the end bearing 13, through the housing 16 and a diaphragm 15. In this manner, the restraining bearing 17 centers the end bearing 13, thus achieving rapid disengagement of the restraining bearing and avoiding a continual springing of the shaft 11 in the restraining bearing 22.

Depending upon the type of application, the restraining bearing is located on the side of the end bearing which faces the center of the rotor, as previously described, or on the opposite side of the bearing. In one embodiment the restraining bearing is coupled to a magnetic end bearing and is arranged on the exterior end of the rotor.

What is claimed is:

1. In a damped restraining bearing for supercritically operating rotors in which the restraining bearing encompasses the rotor with a predetermined gap and is operable responsive to radial rotor movements; a damped bearing for said rotor for damping radial movements thereof; and said restraining bearing including a damping member coupled with said damped bearing for centering said restraining bearing relative to said rotor, the improvement comprising: said damped bearing being an end bearing positioned to engage one end of said rotor.

2. Bearing as claimed in claim 1, said restraining bearing being arranged intermediate the center of the rotor and the end bearing on an axial plane perpendicular to the rotor rotational axis proximate said end bearing.

3. Bearing as claimed in claim 1 or 2, said end bearing comprising a housing, said damping member of said restraining bearing being connected with said housing; a damping liquid in said housing, said end bearing being a damping pivot bearing immersed in said damping liquid.

4. Bearing as claimed in claim 3, said damping housing for said damping pivot bearing comprising an essentially cylindrical receptacle housing the damping pivot bearing arranged therein proximate the bottom thereof, said restraining bearing being anchored at the other end within said damping housing.

5. Bearing as claimed in claim 1, said restraining bearing comprising a ball bearing-supported facing collar.

6. Bearing as claimed in claim 1, said damping member of said restraining bearing comprising a damping cylinder immersed in a damping liquid.

* * * * *